Oct. 20, 1959  R. E. MITTON  2,909,035
PRESSURE AMPLIFYING DEVICE FOR FLUID PRESSURE SYSTEM
Filed Aug. 6, 1956  2 Sheets-Sheet 1
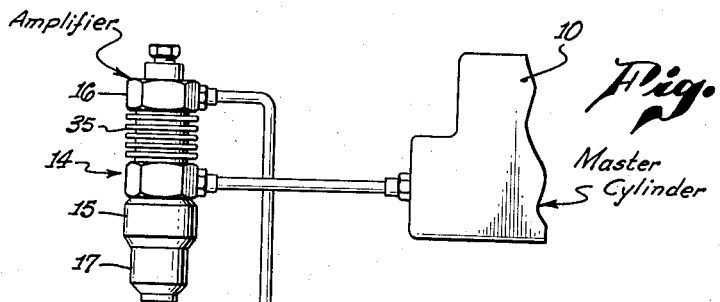
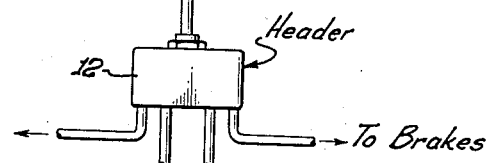
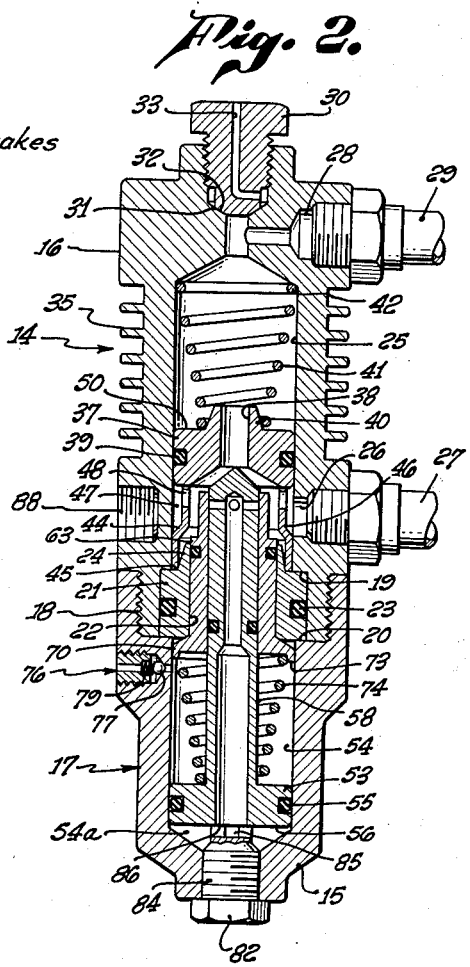
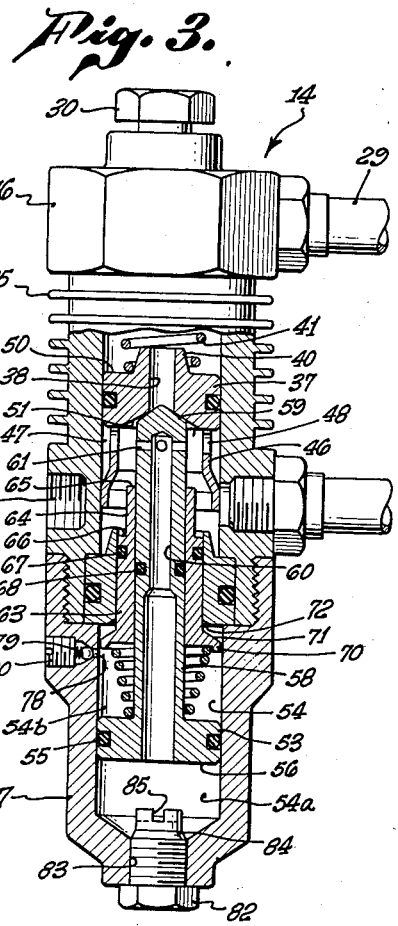
INVENTOR.
ROBERT E. MITTON,
BY
ATTORNEY.

Oct. 20, 1959  R. E. MITTON  2,909,035
PRESSURE AMPLIFYING DEVICE FOR FLUID PRESSURE SYSTEM
Filed Aug. 6, 1956  2 Sheets-Sheet 2

INVENTOR.
ROBERT E. MITTON,
BY
ATTORNEY.

United States Patent Office 2,909,035
Patented Oct. 20, 1959

2,909,035

PRESSURE AMPLIFYING DEVICE FOR FLUID PRESSURE SYSTEM

Robert E. Mitton, Long Beach, Calif., assignor, by mesne assignments, to Hydraflex Corporation, Dallas, Tex., a corporation of Texas Application August 6, 1956, Serial No. 602,220

11 Claims. (Cl. 60—54.5)

This invention relates to a compact pressure multiplying and amplifying device for use in a pressure fluid system such as a closed hydraulic brake system for vehicles. More particularly, the invention relates to a pressure-amplifying device of two stage type in which an incoming low level fluid pressure received by the device is amplified at a preselected fluid pressure to a high level fluid pressure affording fluid braking pressure considerably greater than that resulting from normal increase in incoming fluid pressure.

Hydraulic brake systems normally include a master cylinder with a piston and in communication with a reservoir of brake fluid and with fluid in the braking system. Movement of the master piston caused by pressure application against a brake pedal places fluid in the master cylinder under pressure and this pressure is transmitted through the fluid system to wheel cylinders for actuation of brake shoes at each of the four wheels. Pedal pressure must normally be greatly increased to result in a heavy maximum desired braking pressure at the wheel cylinders.

The present invention includes a simple, compact mechanical device for amplifying and multiplying fluid pressure, the device being positioned in a closed fluid system between a master cylinder and a manifold or header which affords distribution of pressure to individual wheel cylinders. The pressure-multiplying device of this invention permits selected initial application of braking pressures at the wheel cylinders in normal manner. Upon reaching a predetermined increased fluid pressure to which the device is responsive, the resultant pressure transmitted by the amplifying device is substantially increased (for example, doubled) so that for the same pedal pressure a greatly amplified braking pressure is applied at the wheel cylinders. This amplified resultant fluid pressure is achieved without complicated large power brake equipment including vacuum booster devices which are presently utilized in power brake systems.

The primary object of this invention therefore is to design and provide a fluid pressure amplifying device which is of compact, simple construction, occupies a minimum of space, and is readily installed in a fluid pressure system.

An object of this invention is to disclose and provide a fluid pressure amplifying device which becomes operative in response to a predetermined selected fluid pressure.

Another object of this invention is to design and provide a pressure-multiplying device including a pair of spaced pistons arranged in tandem, each having pressure working faces facing in the same direction and in fluid comunication with each other upon development of a predetermined fluid pressure in the system whereby the resultant fluid pressure is substantially increased with minimum of increase in fluid pressure entering the system.

A still further object of this invention is to provide a pressure-multiplying device wherein adjustment means are included for selectively positioning a secondary piston with respect to a primary piston.

Generally speaking, the invention contemplates a tubular body readily attachable to a supporting wall and in a fluid pressure line in a closed fluid pressure system. The tubular body is provided with axially aligned and spaced chambers, each having a piston therein, one of said pistons lying between inlet and outlet ports in said body. The other piston is arranged to cooperate by means of a stem with the first piston to close a piston port therein when fluid pressure in the system reaches a preselected value. Valve means are provided for communication of pressure fluid between working faces on both of said pistons, said valve means being responsive to provide this communication at said preselected pressure whereby incoming pressure fluid acts upon said spaced working faces of said spaced pistons to cause said pistons to be moved in unison to apply a greatly increased pressure to fluid on the outlet side of the device.

In hydraulic brake systems for vehicles, it is highly important that the brakes do not grab so as to cause locking of the wheels and consequent skidding and loss of control. Such wheel locking may be caused by pressure fluctuations in the closed hydraulic brake system produced by eccentricities in a brake drum, such eccentricities creating usually unrelieved, non-compensated undulating fluid pressures. Pressure of a foot on a braking pedal connected to the hydraulic system by mechanical linkage is incapable of sufficient response to such undulating fluid pressures in the fluid system. Therefore, a still further object of this invention is to provide means in the fluid pressure system which will automatically compensate and relieve such undulating fluid pressures so that smooth non-locking application of fluid pressure is afforded for the brake means.

Other objects and advantages of this invention will be readily apparent from the following description of the drawings in which an exemplary embodiment of this invention is shown.

In the drawings:

Fig. 1 is a diagrammatic view of a fluid pressure system including a device embodying this invention.

Fig. 2 is a longitudinal sectional view of the device of this invention shown in Fig. 1.

Fig. 3 is a longitudinal sectional view of the device in operative position with the spaced pistons acting in unison in response to incoming fluid pressure.

Figure 6:
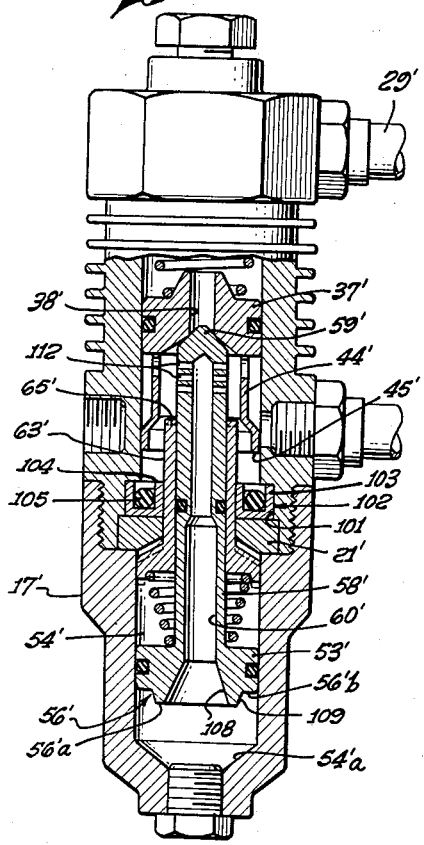
Fig. 6 is a fragmentary, longitudinal sectional view of the device in Fig. 5 illustrating response of the device to pressure variations in the fluid system.

In Fig. 1 is diagrammatically shown a closed fluid pressure system such as a hydraulic brake system for vehicles in which this invention may be utilized. It is understood that the invention may be used in any closed fluid system in which amplification or multiplication of pressure of fluid is desired to more firmly or securely grip an object or apply pressure against a surface.

The exemplary fluid system shown includes a master cylinder 10 having a piston therein responsive to application of braking pressure upon a brake pedal of a vehicle. The outlet of the master cylinder is normally in fluid communication with a key block or header 12 for distribution of pressure fluid to wheel cylinders at each wheel of the vehicle for pressing brake shoes against cooperable brake drums which provide a braking surface.

The compact pressure multiplying device 14 of this invention is designed to be installed between the master cylinder 10 and header 12 in the fluid communication line interconnecting said master cylinder and header. The device 14 includes a tubular body 15 having closed ends and may comprise a pair of body portions 16 and 17 threadedly interconnected as at 18. The body portions 16 and 17 adjacent the threaded connection may be provided with longitudinally spaced opposed internal shoulders 19 and 20, respectively, between which may be gripped and positioned an internal partition wall or stop means 21, said partition wall 21 being provided with an axial bore 22. Seal means 23 in the form of a circumferential groove and O-ring may be carried by the partition wall 21 for sealing the threaded connection of the body portions. The partition wall 21 may include a forwardly projecting extension 24 of tapered section spaced from body portion 16.

Body portion 16 may be provided with an axially disposed primary chamber 25 of uniform diameter and having an inlet port 26 in communication through conduit 27 with the outlet of the master cylinder. Inlet port 26 is provided at one end of the primary chamber adjacent the partition wall 21. At the other end of primary chamber 25 and at the end of the tubular body may be provided a laterally disposed outlet port 28 which may be suitably connected with conduit 29 which leads to header 12.

Adjacent outlet port 28 may be provided a bleeder fitting 30 in communication with primary chamber 25 and including a tapered end 31 seated in normally closed position against a corresponding tapered seat 32 in the end wall of the body portion. A passageway 33 in the bleeder fitting permits escape of air from the fluid system upon partially unthreading the fitting so as to bleed the fluid system in well known manner.

The body portion 16 may include a plurality of longitudinally spaced external circumferential ribs 35 for dissipating heat which may develop from pressure of fluid in primary chamber 25.

Movably positioned within the primary chamber between inlet port 26 and outlet port 28 is a primary piston 37 having an axial port 38 extending therethrough. Circumferential seal means 39 of O-ring and groove arrangement provide a seal between piston 37 and the internal wall surfaces of primary chamber 25. The primary piston may include a forwardly extending spring positioning boss 40 for one end of a primary biasing spring 41, the other end of said spring being seated against the end wall of the primary chamber as at 42. The spring 41 may be of helical tapered form and normally urges the primary piston 37 toward the inlet port 26.

The primary piston may includes a rearwardly extending hollow skirt 44 having a circular end edge 45 normally seated against the partition wall 21. The skirt 44 is provided with an intermediate wall portion 46 of reduced diameter to provide an annular space 47 for fluid between the skirt and the internal wall surfaces of the primary chamber 25. The wall portion 46 includes a plurality of openings 48 therein for communication of pressure fluid from inlet port 26 through said openings 48 to the interior of the skirt, and thence through piston port 38 to outlet port 28.

The primary piston 37 is provided with a piston pressure face 50 facing in the direction of the outlet port 28 and an internal working face 51 facing the inlet port 26 for a purpose later described.

A secondary piston 53 is movably positioned in a secondary chamber 54 in body portion 17, said primary and secondary pistons being axially aligned. The secondary piston 53 carries seal means 55 of O-ring and circumferential groove construction for providing a seal between the secondary piston and the internal surfaces of secondary chamber 54. The secondary piston 53 is provided with a working face 56 facing in the same direction as the working face 51 of the primary piston and having a slightly greater working area than face 51.

The secondary piston 53 includes a forwardly extending axial stem 58 which projects past the stop partition wall 21 and which is provided with a conical stem end portion 59 normally spaced from margins of axial port 38 of the primary piston. The stem end 59 is movable into the axial piston port 38 to close said port under certain fluid pressure conditions as later described.

The stem 58 may be provided with axial channel means 60 terminating at one end in laterally disposed passageways 61 adjacent stem end portion 59, said passageways 61 providing openings of circular form leading to the interior of the skirt of the primary piston. The channel means 60 at its other end opens to a pressure fluid-containing section 54a of secondary chamber 54 and provides fluid communication between said chamber section 54a and the portion of primary chamber 25 adjacent inlet port 26.

Sealing and valve means may be movably slidably positioned between stem 58 and partition wall 21 to open and close openings of lateral passageways 61 of the channel means 60 under preselected fluid pressure conditions. Said valve means may comprise a valve sleeve 63 having a reduced end portion 64 extending within skirt 46 of the primary piston. End portion 64 provides an annular pressure face 65 at its end and defines with the sleeve an annular shoulder providing a second annular pressure face 66 spaced from pressure face 65. The valve sleeve 63 is slidably positioned on stem 58 and within bore 22 of the partition wall 21. Sealing means 67 and 68 are provided for sealing the valve sleeve 63 with respect to bore 22 and stem 58 for preventing fluid communication between primary chamber 25 and the non-pressure fluid containing section 54b of the secondary chamber 54.

The valve sleeve 63 may include a headed end 70 having a tapered face 71 normally seated on a corresponding tapered seat 72 on wall 21. The headed end 70 may include a circumferential rib 73 for positioning within chamber section 54b a helical tapered spring 74 having one end seated against end 70. Spring 74 is seated at its other end against the secondary piston 53 and urges the secondary piston 53 and valve sleeve 63 in opposite directions.

It will be noted that secondary chamber 54 includes pressure fluid-containing section 54a at one end and in communication with working face 56 and a non-pressure fluid containing section 54b between the secondary piston 53 and the headed end 70 of the valve sleeve. Normally only air is contained within the chamber section 54b. After long operation some leakage of pressure fluid into secondary chamber section 54b may occur and to relieve such fluid a ball check valve means 76 is provided in body portion 17. Valve means 76 may comprise a ball valve 77 seated against margins of a bore 78 and biased thereagainst by a spring 79 carried by a ported fitting 80. It will thus be apparent that if a substantial quantity of pressure fluid accumulates in the chamber section 54b, movement of sleeve 63 towards secondary piston 53 will cause the ball check valve to open and permit discharge of fluid therethrough.

Adjustment means for axially positioning the secondary piston 53 are provided in the end wall of the body portion 17 and may include a headed screw 82 threaded into bore 83 and provided with a shank 84 having a transverse slot 85 in the end face thereof for fluid communication between channel means 60 and secondary chamber section 54a. The end face of shank 84 is adapted to seat as at 86 against the end of secondary piston 53. Adjustment of screw 82 will longitudinally displace secondary piston 53 and permit selected adjustment of the spaced relation between stem end 59 and axial port 38 of the primary piston.

Means for mounting the device on a supporting wall or bracket may include a threaded bore 88 which may engage a threaded bolt or stud carried by the supporting wall.

In operation of the pressure multiplying device described above it is understood that the fluid pressure system is a closed system and that fluid completely fills primary chamber 25 on both sides of the primary piston 37, the channel means 60 and the fluid-containing section 54a of the secondary chamber 54. The conduit lines to the master cylinder and to the header and wheel cylinders are free from air. Normal position of the pistons and valve sleeve of the device are shown in Fig. 2, the valve sleeve being seated on partition wall 21 and closing passageway portions 61 of channel means 60. The primary piston is also seated against the partition wall 21 and stem end portion 59 is in selected spaced relation with respect to the margins of piston port 38 to allow communication of fluid pressure therethrough.

Application of pressure to a brake pedal of the vehicle is transmitted to the master cylinder and fluid in the system transmits said pressure to inlet port 26 of the device. Pressure fluid is then transmitted through openings 48 in the skirt, to the interior of the skirt, through space between stem end 59 and primary piston 37, through axial port 38 and into primary chamber 25. Such pressure is transmitted through outlet port 28, through the header, and to the wheel cylinders.

Upon increase in pressure in the fluid system to a preselected amount, such increased pressure, acting against pressure faces 65 and 66 on the valve sleeve 63, overcomes the spring resistance of spring 74 in chamber section 54b and causes said valve sleeve to move rearwardly along stem 58 until the openings to passageway portions 61 of the channel means 60 are uncovered. Uncovering of passageway portions 61 provides communication for said pressure fluid through channel means 60 to the fluid-containing section 54a of secondary chamber 54. Pressure acting upon working face 56, which has a greater working area than face 51 on primary piston 37 causes the secondary piston 53 to move axially toward the primary piston 37 until the stem end portion 59 seats against the primary piston 37 and closes the axial piston port 38. When port 38 is closed increase in pressure of incoming fluid through inlet port 26 is communicated to and acts upon working face 51 of the primary piston 37 and also working face 56 of the secondary piston. The increase in pressure area against which the pressure fluid acts causes the primary piston 37 and secondary piston 53 to move simultaneously and in unison in a direction toward outlet port 28. The secondary piston 53 is capable of such movement because of the non-pressure fluid containing section 54b of the secondary chamber, the spring 74 not being sufficient to resist such movement at selected pressure conditions. The tandem arrangement of longitudinal spaced working faces 51 and 56 provides effective multiplication of incoming fluid pressure which is then transmitted through the fluid in primary chamber 25 through the outlet port 28 and to the header and wheel cylinders.

Upon release of brake pedal pressure, a decrease in fluid pressure occurs at inlet port 26, within the skirt of primary piston 37, and within the pressure fluid containing section 54a of the secondary chamber 54. Upon such decrease in fluid pressure the spring 74 in the secondary chamber 21 urges valve sleeve 63 forwardly to seat on partition 21 and simultaneously urges the secondary piston 53 rearwardly to its normal position. As the secondary piston 53 is displaced rearwardly, stem portion 59 opens piston port 38 to permit relief of fluid pressure in primary chamber 25. Spring 41 in the primary chamber 25 then returns the primary piston 37 to its normal position as shown in Fig. 2.

It will thus be apparent that initial brake pedal pressure will apply braking pressure to brake shoes as in a normal hydraulic brake system and the extent to which normal braking is effective during this first stage of pressure operation depends upon the characteristics of pressure faces 65, 66 on the valve means 63 and spring 74 in the secondary chamber. To fully utilize the advantages of device 10, the first stage of pressure operation is relatively short and effective only during very light braking pressure. Upon fluid pressure reaching a selected amount or value, device 10 becomes operative by response of valve means 63 to the preselected pressure of fluid and the tandem piston arrangement then becomes operative to amplify or multiply the pressure of incoming fluid in relation to the total pressure area of the working faces 51 and 56 on the primary and secondary pistons. Resultant pressure on the outlet side of the primary piston is thus stepped up to a high pressure level and further increase of incoming fluid pressure will be amplified in accordance with the second stage of pressure operation of the device.

Figure 5:
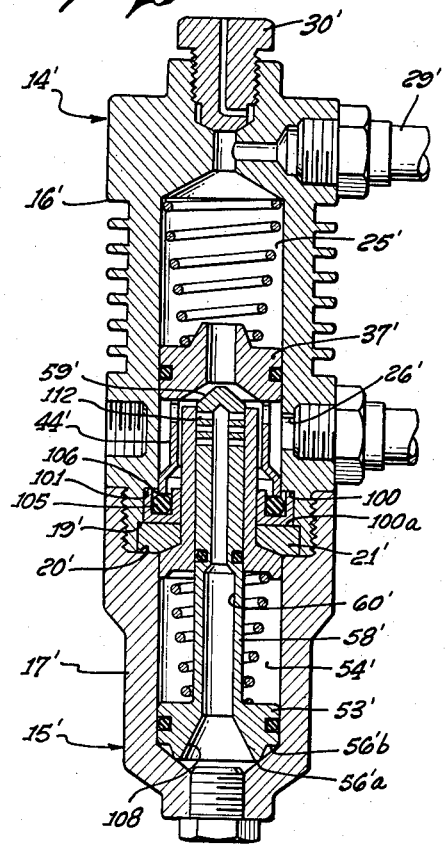
Fig. 5 is a longitudinal sectional view of a different embodiment of this invention, the device being shown at high level fluid pressure stage.
Figure 4:
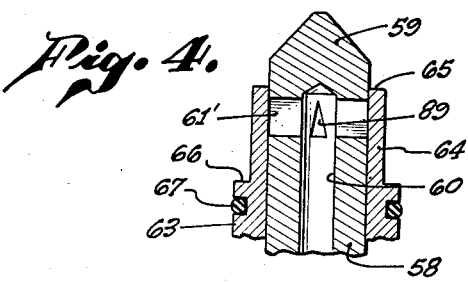
Fig. 4 is a fragmentary sectional view of a different form of valved opening provided in the stem of the secondary piston.

In Fig. 5 the openings of passageways 61 are modified to afford relatively smooth transition from the low level pressure operative stage to the relatively high level second operative pressure stage of the device. In this modification openings of passageways 61' are of axially elongated variable increasing area, such as a triangle 89, so that rate of fluid communication between the secondary chamber section 54a and the interior of the skirt of the primary piston may be progressively increased. Thus the transmission from a low level to a high level pressure stage may be accomplished without sudden change.

In Figs. 5 and 6 a modified pressure multiplying device 14' is shown and described with like parts assigned like reference numerals with a prime sign. Only the differences in construction and operation between device 14 and 14' will be described for brevity.

In device 14' a hollow tubular body 15' includes a pair of interconnected body portions 16' and 17'. At their interconnection, a partition wall 21' is retained between opposed shoulders 19' and 20'. Body portion 16' is provided with an inwardly spaced annular shoulder 100 defining with the faces 100a of partition wall 21' opposed thereto an annular recess 101 within which may be positioned a U-section seal member 102. An outer annular flange 103 of seal member 102 is seated under compression between face 100a and shoulder 100. An inner annular flange 104 is seated against the outer cylindrical surface of a pressure-responsive sealing and valve sleeve member 63'. Within the U-section member 102 may be seated an annular metal member 105 which may afford a seat at 106 for an end face 45' of a hollow skirt 44' of primary piston 37'. It will be apparent from the drawings that incoming pressure fluid introduced through inlet port 26' will fill the spaces between the flanges 104 and 103 and cause expansion of said flanges into sealing relation with the sleeve member 63' and the body portion 17'.

It will be noted that the movable pressure-responsive valve sleeve member 63' in this embodiment has only an end annular pressure face 65' and does not include a longitudinally spaced pressure face 66 as shown in the prior embodiment.

Another difference in construction of device 14' includes the construction of secondary piston 53' wherein channel means 60' is outwardly flared as at 108. An annular working face 56' comprises an end inner working face portion 56'a of relatively small area and axially forwardly spaced therefrom an outer annular working face portion 56'b. The working face portions may be joined by a frusto-conical surface 109. By this construction of the working end of the secondary piston 53', a smooth transition is provided between low level and high level pressure stages since fluid pressure entering channel 60' and entering the non-compressible fluid portion 54'a of secondary chamber 54' reacts first against working face portion 56'a of relatively small working area and then later against the somewhat enlarged working face portion area 56'b. Thus the secondary piston 53' is moved toward the primary piston 37' relatively smoothly so that stem 58' will slowly close axial port 38' in primary piston 37'. The stem 58' has a tapered end 59' similar to the prior embodiment.

Inwardly of stem end portion 59', the channel means 60' communicates with primary chamber 25' on the inlet side of primary piston 37' by means of a plurality of transversely disposed axially spaced through bores 112. Through bores 112 arranged as shown provide still another means for varying the flow area between secondary chamber 54' and primary chamber 25'. It will be readily apparent that as sleeve member 63' is moved toward the secondary piston, the bores 112 will be successively and progressively uncovered so as to increase flow of incoming pressure fluid into the non-compressible portion 54'a of the secondary chamber 54'.

Operation of the embodiment shown in Figs. 5 and 6 is generally the same as that of the prior embodiment and such operation will not be described in detail. Operation of device 14' includes a more gradual smooth change from low level to high level pressure stage, such change being provided by the spaced working face portions of the secondary piston 53' and the progressive uncovering of bores 112 in the stem 58'.

Response of the device 14' shown in Fig. 5 to pressure undulations is illustrated in detail in Fig. 6 wherein the pressure reaction valve sleeve member 63' is spaced from its seat on the partition wall 21'. Pressure undulations or surges of pressure fluid entering primary chamber 25' cause backward movement of the primary piston 37' simultaneously with that of secondary piston 53' at high level stage when they act in unison. Such backward movement causes pressure fluid in chamber 54'a to flow through channel 60' and bores 112 into primary chamber 25' on the inlet side of the primary piston 37'. Increase in fluid pressure within the skirt 44' acts against the pressure face 65' on the valve sleeve 63' to cause said sleeve to move axially inwardly into the secondary chamber portion 54'b which contains a compressible fluid such as air. The air acts as a yieldable compressible fluid for dampening movement of the reaction sleeve 63'. The combination of compressible air and compression spring 74' serves to compensate for and relieve pressure undulations in primary chamber 25'. It will be readily understood that the pressure-responsive valve sleeve 63' is also capable of compensating for pressure undulations at low pressure stages by movement into secondary chamber portion 54'b.

It will be understood by those skilled in the art that various modifications and changes may be made in the pressure-multiplying device described above and which may come within the spirit of this invention and all such changes and modifications coming within the appended claims are embraced thereby.

I claim:

1. A compact amplifier for hydraulic brake systems, comprising: a tubular body provided with closed ends, said tubular body including a primary chamber at one end and a secondary chamber at the other end of the body, said chambers being axially aligned; an inwardly extending stop means provided with an axial bore, separating said chambers; an outlet in communication with the end of the primary chamber and adapted to be connected to braking devices; an inlet for pressure fluid leading into said primary chamber adjacent the stop means; a primary piston movably positioned in the primary chamber and provided with an axial port; a secondary piston movably positioned in the secondary chamber, said secondary piston including a stem extending past said stop means and the end of said stem being adapted to seal the port in the primary piston upon movement of said secondary piston; a movable sealing and valve means encircling said stem and seated in the bore of said stop means; a spring biasing said secondary piston and movable valve means in opposing directions; and channel means extending through said stem and communicating one face of said secondary piston with the primary chamber adjacent the end of the stem, said channel means being normally closed by said movable sealing and valve means whereby pressure fluid from the inlet may pass through said primary piston directly to the outlet from the primary chamber, increase in pressure of fluid from said inlet being adapted to move said movable sealing and valve means to open said channel means and supply fluid pressure to the face of the secondary piston to move the same and its stem into port closing position whereby pressure fluid is caused to act upon both primary and secondary pistons.

2. A compact amplifier for hydraulic systems as stated in claim 1 including adjustable means carried by the body to adjust the end of said stem relative to the port in the primary piston.

3. A compact amplifier for hydraulic brake systems, comprising: a tubular body provided with closed ends, said tubular body including a primary chamber at one end and a secondary chamber at the other end of the body, said chambers being axially aligned; an inwardly extending stop means provided with an axial bore separating said chambers; an outlet in communication with the end of the primary chamber and adapted to be connected to braking devices; an inlet for pressure fluid leading into said primary chamber adjacent the stop means; a primary piston movably positioned in the primary chamber and provided with an axial port; a secondary piston movably positioned in the secondary chamber, said secondary piston including a stem, the end of said stem being adapted to seal the port in the primary piston upon movement of said secondary piston; a movable sealing and valve means encircling said stem; a spring biasing said secondary piston and movable valve means in opposing directions; and channel means extending through said stem and communicating one face of said secondary piston with the primary chamber adjacent the end of the stem, said channel means being normally closed by said movable sealing and valve means and opened by increase of pressure fluid acting upon said valve means to move said valve means.

4. A compact pressure amplifier for hydraulic brake systems, comprising: a tubular body provided with closed ends and including a primary chamber at one end and a secondary chamber at the other end of the body, said chambers being axially aligned; an outlet in communication with the end of the primary chamber and adapted to be connected to braking devices; an inlet for pressure fluid in communication with said primary chamber and spaced from said outlet; a primary piston movably positioned between said inlet and outlet in the primary chamber and provided with a port; a secondary piston movably positioned in the secondary chamber, said secondary piston including a stem having an end adapted to seal the port in the primary piston upon movement of said secondary piston; a movable sealing and valve means encircling said stem and slidably mounted in said body; a spring biasing said secondary piston and movable valve means in opposite directions; and channel means extending through said stem and communicating one face of said secondary piston with the primary chamber adjacent the end of the stem and on the inlet side of the primary piston, said channel means being normally closed by said movable sealing and valve means and being opened by movement of said valve means upon increase in pressure of fluid from said inlet.

5. A compact amplifier for hydraulic systems as stated in claim 4 including check valve means for the secondary chamber in the part of said chamber between the secondary piston and the valve means for relief of pressure fluid therein.

6. A compact pressure amplifier for a fluid system, comprising: a tubular body provided with a primary chamber and a secondary chamber in axial alignment; an outlet in communication with an end of the primary chamber and an inlet in communication with the other end of the primary chamber; a primary piston in the primary chamber movably positioned between the inlet and outlet and having an axial port and a pressure face on the side toward the inlet; a secondary piston in the secondary chamber including a stem and a pressure face facing the same direction as the pressure face on the primary piston, said secondary piston being movably positioned for sealing the port in the primary piston with the end of said stem; a valve sleeve encircling said stem and slidably movable thereon; a spring between said secondary piston and valve sleeve; and channel means in communication between the pressure face on the secondary piston and the pressure face on the primary piston, said channel means being normally closed to isolate said pressure face on the secondary piston from the pressure face on the primary piston, said valve sleeve being movable upon increase of pressure fluid in said primary chamber to open said channel means and to cause said secondary piston to move to close said port in said primary piston whereby pressure fluid acting against the pressure faces on said primary and secondary pistons increases pressure of fluid between said primary piston and said outlet.

7. In a closed hydraulic system the provision of a pressure-multiplying device comprising: a tubular body provided with an inlet port intermediate the ends of the body, said inlet port being adapted to receive fluid at varying pressure, and an outlet port at one end of said body; a ported primary piston, movably positioned in said body between said inlet and outlet, and adapted to transmit incoming pressure fluid at low levels to said outlet, said ported piston having a working face; a secondary piston positioned in said body and having a working face in spaced relation to the face of said primary ported piston, said secondary piston being movable in the direction of flow of low level pressure fluid through the port in said portion; and yielding means operable by increase in pressure of incoming fluid to admit such incoming fluid to the working face on said secondary piston and to thereby move said secondary piston and close said port in said primary piston, whereby said incoming fluid acts upon spaced working faces of both primary and secondary pistons simultaneously to compress fluid between the primary piston and the outlet.

8. In a pressure amplifying device for a closed fluid pressure system, the combination of: a tubular body provided with a primary chamber adapted to be completely filled with pressure fluid and an axially aligned secondary chamber adapted to be partially filled with pressure fluid, said tubular body being provided with longitudinally spaced inlet and outlet ports in communication with said primary chamber; a primary piston provided with a port movable in said primary chamber and biased toward the secondary chamber; a secondary piston in said secondary chamber having a working face in that portion of the secondary chamber partially filled with pressure fluid and having a stem extending to said axial port in said primary piston and normally in spaced relation thereto for fluid communication through said port, said stem being provided with channel means for fluid communication between said working face on said secondary piston and said working face on said primary piston; movable sealing and valve means between said stem and said body, said valve means normally closing said channel means; and spring means biasing said secondary piston and said valve means in opposite directions, said valve means having pressure faces thereon in said primary chamber; whereby incoming pressure fluid is in communication with said primary chamber and said outlet and upon increase in fluid pressure, said valve means is movably responsive thereto to open said channel means to provide communication between said primary chamber and said pressure fluid containing section of said secondary chamber to cause said secondary piston to move to close said port in said primary piston for action of incoming pressure fluid on working faces of both primary and secondary piston.

9. In a closed hydraulic system, the provision of a pressure-multiplying device comprising: a tubular body provided with an inlet port intermediate the ends of the body, said inlet port being adapted to receive fluid at varying pressure, and an outlet port spaced from said inlet port; a primary piston movably positioned in said body between said inlet and outlet ports and adapted to transmit incoming pressure fluid at low levels to said outlet port, said primary piston having a working face on the inlet side thereof; a secondary piston positioned in said body and having a working face in spaced relation to the working face of said primary piston, said working face including axially spaced annular working face portions of different areas, and said secondary piston having an extension extending toward said primary piston; means providing fluid communication between the inlet and outlet sides of the primary piston; and means operable by increase in pressure of incoming fluid to move said secondary piston and its extension to close said fluid communication means and to admit such incoming fluid to the working face of said secondary piston, whereby said incoming fluid acts upon said spaced working faces of both primary and secondary pistons to move said pistons in unison.

10. In a closed hydraulic system, the provision of a pressure-multiplying device comprising: a tubular body provided with an inlet port intermediate the ends of the body, said inlet port being adapted to receive fluid at varying pressure, and an outlet port spaced from said inlet port; a primary piston movably positioned in said body between said inlet and outlet ports and adapted to transmit incoming pressure fluid at low levels to said outlet port, said primary piston having a working face on the inlet side thereof; a secondary piston positioned in said body and having a working face in spaced relation to the working face of said primary piston, said secondary piston having an extension extending toward said primary piston; means providing fluid communication between the inlet and outlet sides of the primary piston; means operable by increase in pressure of incoming fluid to move said secondary piston and its extension to close said fluid communication means and to admit such incoming fluid to the working face of said secondary piston, whereby said incoming fluid acts upon said spaced working faces of both primary and secondary pistons to move said pistons in unison; and pressure responsive means between said primary and secondary pistons operative when said pistons act in unison for yieldingly compensating for pressure undulations in said system.

11. A fluid pressure amplifying device for a fluid pressure system, comprising: a tubular body provided with spaced primary and secondary chambers, said primary chamber being provided with longitudinally spaced inlet and outlet ports, a primary piston operable in said primary chamber between said inlet and outlet ports; a secondary piston operable in said secondary chamber and movable relative to said primary piston and having means extending between said primary and secondary chambers cooperable with said primary piston to cause both pistons to move in unison; means providing fluid communication between said inlet and outlet ports, said extension means on said secondary piston closing said communication means under selected fluid pressure conditions; pressure responsive means extending between said primary and secondary chambers admitting pressure fluid to the working face of said secondary piston so as to effect movement of said secondary piston toward the primary piston, said secondary chamber including a chamber portion between said secondary piston and the pressure responsive means which is provided with a compressible fluid; and means providing fluid communication between the working face of the secondary piston and the portion of the primary chamber between said primary piston and said pressure-responsive means.

References Cited in the file of this patent

UNITED STATES PATENTS

| | | |
|---|---|---|
| 791,075 | Carpenter | May 30, 1905 |
| 2,272,360 | Swift | Feb. 10, 1942 |
| 2,351,872 | Parker | June 20, 1944 |
| 2,436,268 | Schnell | Feb. 17, 1948 |
| 2,813,399 | Valentine | Nov. 19, 1957 |

FOREIGN PATENTS

| | | |
|---|---|---|
| 128,027 | Australia | July 1, 1948 |

UNITED STATES PATENT OFFICE

CERTIFICATE OF CORRECTION

Patent No. 2,909,035                                             October 20, 1959

Robert E. Mitton

It is hereby certified that error appears in the printed specification of the above numbered patent requiring correction and that the said Letters Patent should read as corrected below.

Column 2, line 60, after "closed" insert -- pressure --; column 3, line 48, after "primary" insert -- piston --; column 6, line 38, for "faces" read -- face --; column 9, line 38, for "portion" read -- piston --.

Signed and sealed this 19th day of April 1960.

(SEAL)
Attest:

KARL H. AXLINE                                              ROBERT C. WATSON

Attesting Officer                                         Commissioner of Patents